Sept. 20, 1938.   A. BARÉNYI   2,130,784
PHOTOGRAPHIC SHUTTER
Filed May 2, 1936
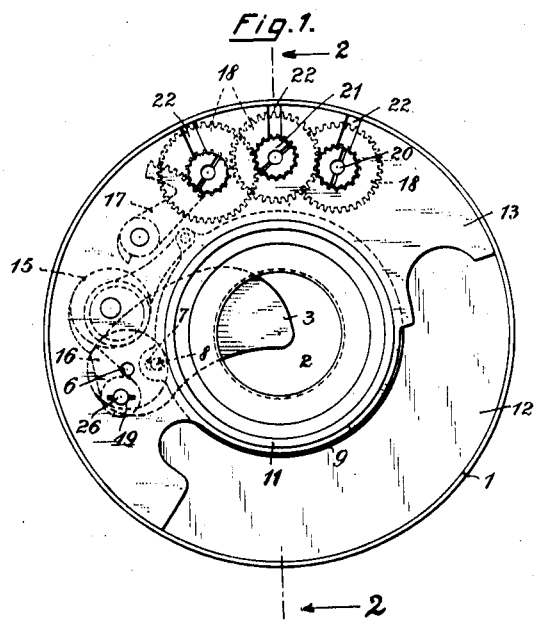
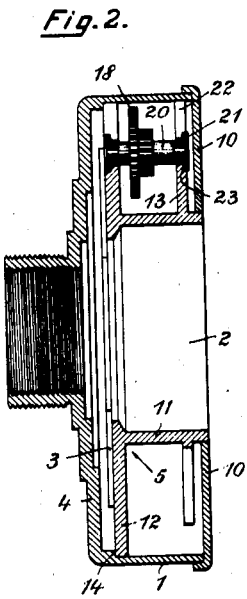
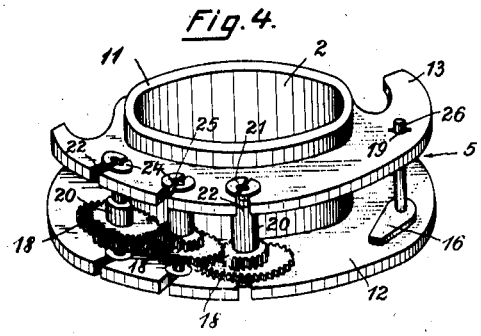
Inventor:
Árpád Barényi
by Frank Reichard
Attorney.

Patented Sept. 20, 1938

2,130,784

UNITED STATES PATENT OFFICE 2,130,784

PHOTOGRAPHIC SHUTTER

Árpád Barényi, Berlin-Steglitz, Germany, assignor to Voigtlander & Sohn Aktiengesellschaft, Brunswick, Germany, a joint-stock company of Germany Application May 2, 1936, Serial No. 77,565
In Germany May 14, 1935

1 Claim. (Cl. 95—63)

My invention relates to improvements in photographic shutters, and more particularly in the type of pivoted blade, symmetrically opening shutter. Shutters of this type comprise a casing and a partition member within said casing upon which latter most of the shutter operating mechanism is carried, and in constructions now in use the said partition member comprises a tubular member providing the exposure or lens opening and formed at one end with a flange providing a support for one of the ends of the shafts of the wheels and other operative parts of the shutter mechanism, the said shafts being supported at their opposite ends in brackets fixed to the said flange. The object of the improvements is to provide a shutter in which the said partition member and the mounting of the operative parts are simple in construction, and in which room is spared for mounting the operative parts of the mechanism. With this object in view my invention consists in constructing the said partition member, in addition to the tubular member and the flange provided at one end, with a flange carried by the opposite end of the said tubular member, the said additional flange being rigidly connected to or made integral with the tubular member, the said flanges providing the supports for both ends of the shafts of the wheels. Therefore brackets for supporting the mechanism may be dispensed with, and much room is spared. Further, the supporting member is able to take up even high strains exerted by shutter mechanism operated at high speed.

For the purpose of explaining the invention an example embodying the same has been shown in the accompanying drawing in which the same reference characters have been used in all the views to indicate corresponding parts. In said drawing, Fig. 1 is an elevation taken transversely of the axis of the shutter casing and showing the partition member and the two flanges thereof, Fig. 2 is a sectional elevation taken on the line 2—2 of Fig. 1, Fig. 3 is a sectional elevation on an enlarged scale showing one of the bushings fitted in the bores of the flanges and providing bearings for the shafts of the wheels, and Fig. 4 is a perspective view showing the said partition member and some of the gear wheels mounted thereon.

In the construction shown in the figures the shutter comprises the usual annular casing 1 having an exposure or lens opening 2 normally closed by blades 3, the said blades being confined between the rear wall 4 of the casing and a partition member 5 upon which latter most of the shutter operating mechanism is carried. Each of the blades is mounted on a pivot bolt 6, and it is provided with a slot 7 engaged by a pin 8 secured to an annular operating member 9. Thus the blades 3 are opened and closed by reciprocating rotary movement imparted to the member 9 as is known in the art. At its front side the shutter casing is closed by an annular plate 10.

The partition member 5 comprises a tubular portion 11 and flanges 12 and 13 fixed to or made integral with the said tubular portion at or near the ends thereof, the said partition member being fitted with its flange 12 on a shoulder 14 formed on the inner cylindrical wall of the casing 1. Within the annular space provided between the flanges 12 and 13 the operative parts of the shutter mechanism and also the annular operating member 9 are mounted. In the figures only some of the said operative parts are illustrated, viz. a motor or master member 15, one of the latches 16 thereof and a toothed segment 17 cooperating with the motor or master member and connected with a retarding mechanism 18. In Fig. 1 only three of the gear wheels of the said retarding mechanism have been shown.

For clearness sake other parts of the shutter mechanism have not been illustrated in the figures.

In such cases in which the rotary parts may be mounted by placing the said parts between the flanges 12 and 13 and thereafter passing the shafts therethrough the said shafts may be directly mounted in coaxial bores of the flanges. Thus, for example, the shaft 26 of the latch 16 is directly mounted in coaxial bores 19. These bores may be exactly made by one operation of the tool. In other cases in which the gear wheels or other parts are fixed to the shaft I mount the said shafts in bushings fitted in bores of the flanges. Thus, for example, the shafts 20 of the gear wheels of the retarding mechanism 18 are fixed to the said gear wheels, and they are mounted in bushings 21 screwed or otherwise fixed in bores 23 of the flanges, the outer diameter of the bushings and the said bores being much larger than the diameter of the shafts. The flanges 12, 13 are formed with radial slits 22 beginning from the margin thereof and ending in the bores 23. Thus for assembling the parts the gear wheels and their shafts are inserted into the bores 23 through the said slits 22, and thereafter the bushings 21 are fitted in the bores. Preferably the said bushings are made from high grade material, and they are formed with flanges 24, as is shown in Fig. 3, the said flanges 24 insuring the axial position of the bushings in the flanges 12 and 13. Thus the shafts 20 are mounted in the bores 25 of the bushings, and they are exactly centered because the bores 23 made in both flanges 12 and 13 are made by one operation.

Of course, one of the flanges, and more particularly the flange 13 need not extend all around the circumference of the shutter casing but it need be provided only at such parts where bearings are needed. Thus, as is shown in Figs. 1 and 4 the flange 13 is in the form of a segment.

I claim:

A shutter for photographic cameras including a casing, a partition member consisting of a tubular portion with two integrally spaced-apart flanges extending outwardly therefrom, the flanges of the partition member being provided with aligned orifices and with slots extending from the orifices to the margins of the flanges, said partition member being adapted to be seated within said casing, a pivotally mounted shutter-blade arranged within the casing, means borne by said partition member adapted to move said shutter-blade on its pivot, and means for controlling the operation of said motor, such means including a shaft applicable to and removable from the axially aligned orifices in the flanges of the partition member, and bearing blocks for such shaft applicable to and removable from the said orifices in the flanges.

ÁRPÁD BARÉNYI.